United States Patent
Heidlmayer

(10) Patent No.: US 9,956,622 B2
(45) Date of Patent: May 1, 2018

(54) CHUCKING APPARATUS FOR A WORKPIECE WITH HONEYCOMB STRUCTURE

(71) Applicant: GFM—GmbH, Steyr (AT)

(72) Inventor: Franz Heidlmayer, St. Marien (AT)

(73) Assignee: GFM—GmbH, Steyr (AT)

( * ) Notice: Subject to any disclaimer, the term of this patent is extended or adjusted under 35 U.S.C. 154(b) by 0 days. days.

(21) Appl. No.: 14/695,259

(22) Filed: Apr. 24, 2015

(65) Prior Publication Data

US 2015/0306678 A1    Oct. 29, 2015

(30) Foreign Application Priority Data

Apr. 29, 2014    (AT) .............................. A50310/2014

(51) Int. Cl.
| | | |
|---|---|---|
| B23B 31/30 | (2006.01) |
| B23Q 3/08 | (2006.01) |
| B25B 11/00 | (2006.01) |
| B26D 3/00 | (2006.01) |
| B23Q 3/06 | (2006.01) |
| B26D 7/01 | (2006.01) |
| B64F 5/10 | (2017.01) |

(52) U.S. Cl.
CPC ............ B23B 31/307 (2013.01); B23Q 3/062 (2013.01); B23Q 3/088 (2013.01); B25B 11/005 (2013.01); B26D 3/006 (2013.01); B26D 7/018 (2013.01); *B23B 2215/04* (2013.01); *B23Q 2703/04* (2013.01); *B64F 5/10* (2017.01); *Y10T 279/11* (2015.01)

(58) Field of Classification Search
CPC ..... B23B 31/307; B23B 2215/04; B23Q 3/08; B23Q 3/062; B23Q 3/088; B23Q 2703/04; B25B 11/005; Y10T 279/11
See application file for complete search history.

(56) References Cited

U.S. PATENT DOCUMENTS

| | | | |
|---|---|---|---|
| 4,066,249 A * | 1/1978 | Huber ................... | B25B 11/005 269/21 |
| 6,217,013 B1 * | 4/2001 | Foreman ............... | B25B 11/005 269/21 |

(Continued)

FOREIGN PATENT DOCUMENTS

| | | |
|---|---|---|
| DE | 41 30 623 A1 | 3/1993 |
| DE | 10 2009 045 536 A1 | 4/2011 |

(Continued)

OTHER PUBLICATIONS

Machine translation, German patent document, DE202013100632U1, "Vacuum Clamping Device", Horst, Mar. 2013.*

*Primary Examiner* — Eric A Gates
*Assistant Examiner* — Chwen-Wei Su
(74) *Attorney, Agent, or Firm* — Collard & Roe, P.C.

(57) ABSTRACT

A chucking apparatus for a workpiece with honeycomb structure includes a table that can be supplied with vacuum and a clamping plate which can be placed on the table and which accommodates the workpiece in the region of an already profiled surface determined by the face ends of the honeycombs, whose receiving surface, which corresponds to the profiled surface of the workpiece, is provided with suction openings to the table. In order to provide advantageous chucking conditions, the clamping plate has an open-cell structure.

3 Claims, 2 Drawing Sheets

(56) References Cited

U.S. PATENT DOCUMENTS

2008/0281011 A1* 11/2008 Strauss ................. C08J 9/0066
                                                                521/122
2011/0135887 A1* 6/2011 Saff .......................... B32B 3/06
                                                                428/192

FOREIGN PATENT DOCUMENTS

| | | | | |
|---|---|---|---|---|
| DE | 10 2011 100 702 A1 | | 11/2012 | |
| DE | 202013100632 U1 | * | 3/2013 | ........... B25B 11/005 |
| FR | 2784926 A3 | * | 4/2000 | ........... B25B 11/005 |
| GB | 601485 A | * | 5/1948 | ........... B23B 31/307 |
| GB | 1099566 A | * | 1/1968 | ........... B23B 31/307 |
| WO | WO 2011064349 A1 | * | 6/2011 | ............ B23Q 1/035 |

* cited by examiner

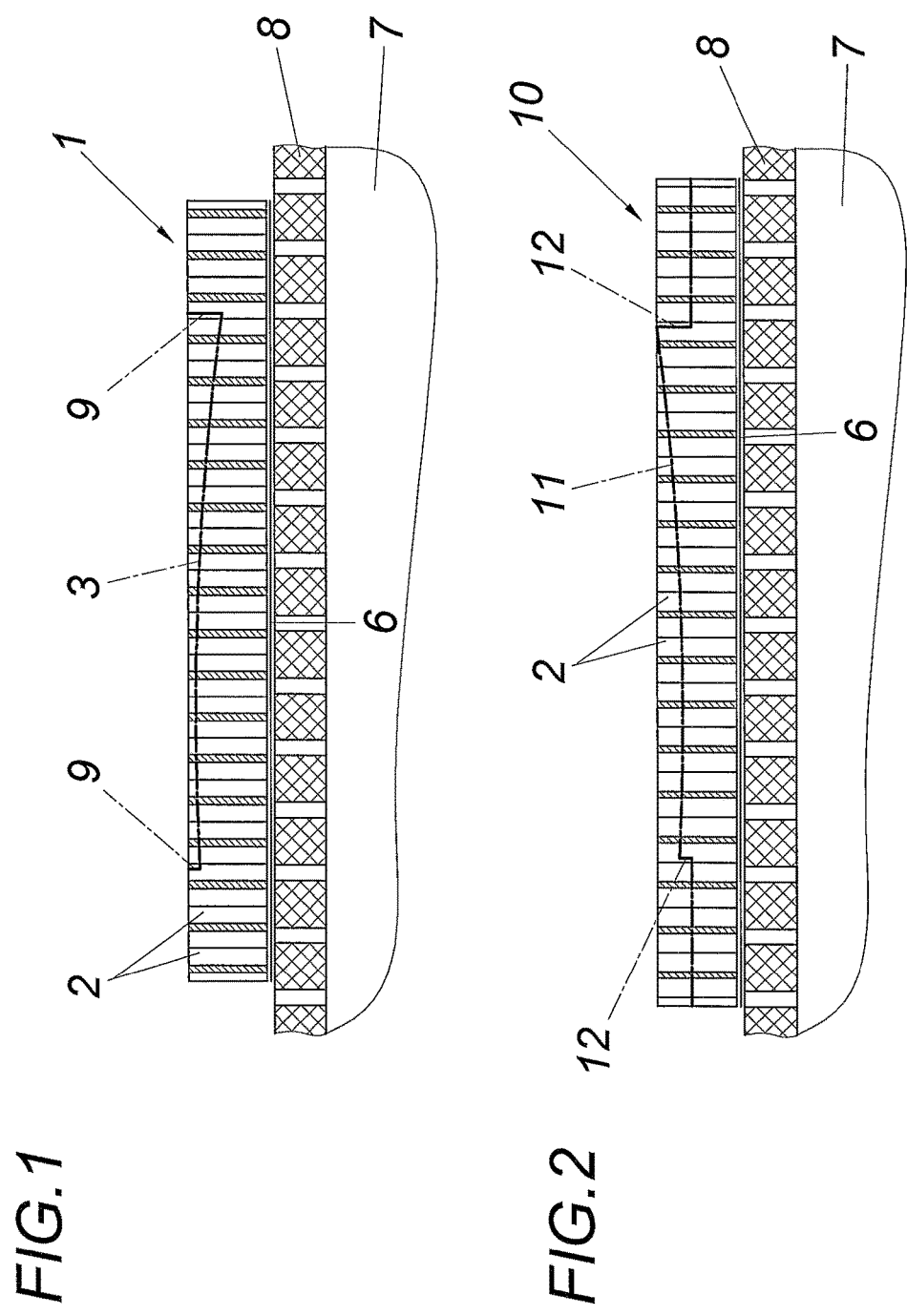

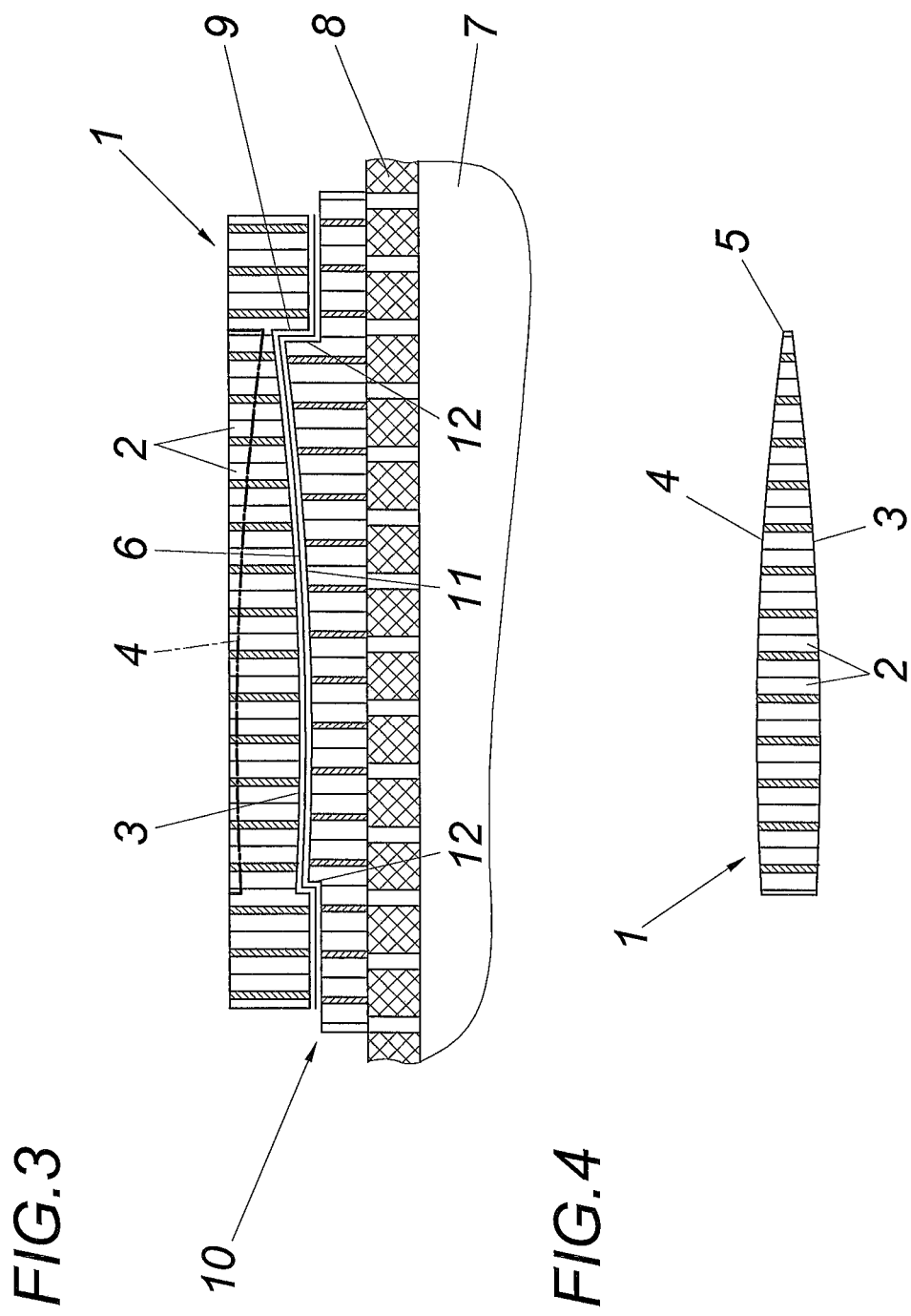

CHUCKING APPARATUS FOR A WORKPIECE WITH HONEYCOMB STRUCTURE

CROSS REFERENCE TO RELATED APPLICATIONS

Applicant claims priority under 35 U.S.C. § 119 of Austrian Application No. A50310/2014 filed Apr. 29, 2014, the disclosure of which is incorporated by reference.

BACKGROUND OF THE INVENTION

1. Field of the Invention

The invention relates to a chucking apparatus for a workpiece with honeycomb structure, comprising a table that can be supplied with a vacuum and a clamping plate which can be placed on the table and which accommodates the workpiece in the region of an already profiled surface which is determined by the face ends of the honeycombs, whose receiving surface corresponding to the negative shape of the profiled surface of the workpiece is provided with suction openings to the table.

2. Description of the Related Art

Lightweight components, as are used in the construction of aircraft for example, comprise a core with honeycomb structure which is joined with cover layers into a composite body. Since the core represents the shaping element, the two surfaces determined by the face ends of the honeycomb must be machined by means of cutting or milling tools. The proper chucking of said workpieces with honeycomb structure for machining does not pose any problems as long as the workpiece has a flat surface on one side, because in this case the workpiece can be tightly held ready for machining on an air-permeable table that can be supplied with vacuum according to the state of the art (DE 10 2011 100 702 A1, DE 41 30 623 A1) after masking the honeycomb openings on the side of the flat surface with an air-impermeable film, which occurs over the entire chucking surface. After the profiling of the one surface, it is necessary to turn the workpiece for machining the opposite surface, so that the workpiece needs to be chucked via the already profiled surface. A clamping plate is used for this purpose (DE 41 30 623 A1) which forms a receiver for the workpiece which corresponds to the negative shape of the profiled workpiece surface and which rests flush on the contact surface of the clamping plate after the closure of the honeycomb openings with a film. The workpiece can be sucked towards the table through the clamping plate via its already machined surface by means of suction openings provided in the clamping plate. The clamping effect is considerably reduced in comparison with direct suction of the workpiece to the table due to the limited number of suction openings, even when the receiving surface of the clamping plate is provided with distributing grooves connected to the suction openings. It is an additional factor that the machining of the clamping plates, which are usually made of a light metal, is work-intensive. In order to avoid this effort for machining the second surface, it has already been proposed (DE 10 2011 100 702 A1) to machine the honeycomb-like workpiece on the one side in such a way that after bending of the workpiece not only the machined surface but also the flat surface required for clamping the workpiece assume the required surface contours. However, such bending is only possible within limits and unsuitable for some applications.

SUMMARY OF THE INVENTION

The invention is thus based on the object of providing a chucking apparatus for a workpiece with honeycomb structure to be machined on both honeycomb sides such that chucking conditions which correspond to direct chucking of the workpiece on a table with suction can be ensured with relatively little effort for the workpiece that has already been machined on one honeycomb side.

This object is achieved by the invention in such a way that the clamping plate has an open-cell structure.

The open-cell structure of the clamping plate allows constant suction engagement through the clamping plate over the entire receiving surface, because the open-cell structure of the clamping plate allows constant suction of the entire receiving surface into which the open structural cells lead. This means that a workpiece with honeycomb structure, which is placed with its already profiled surface surface covered by an air-tight film onto the receiving surface of the clamping plate with the same shape, is held by the open-cell structure of the clamping plate in a manner which can certainly be compared with direct suction of the as yet unprocessed workpiece on the table. The constant chucking of the workpiece over the entire receiving surface of the clamping plate promotes the machining of the workpiece especially in thin boundary regions which have lower own strength, because the workpiece is effectively sucked towards the receiving surface also in the area of these thin wall regions.

Especially advantageous constructional conditions are obtained when the open-cell structure of the clamping plate is achieved by a honeycomb structure, because in this case the honeycombs, which determine the receiving surface with their face ends, form flow channels which are aligned in parallel in the suction direction, are separated from each other by the honeycomb walls, and not only have comparatively large flow cross-sections, but also offer a respectively low flow resistance.

The centering of the workpiece in relation to the clamping plate requires respective measures due to the honeycomb structure of the clamping plate. Advantageous centering of the workpiece in relation to the receiving surface of the clamping plate can advantageously be achieved in such a way that the clamping plate, adjacent to the receiving surface for the workpiece, forms a re-entrant centering stop which cooperates with a counter stop of the workpiece. The counter stop of the workpiece thus protrudes against the already profiled surface, so that said counter stops support the holding down of the workpiece in the region of the boundary regions to be machined, since said counter stops only need to be separated after the machining of the second surface of the workpiece.

The open-cell structure of the clamping plate further opens the possibility of producing the receiving surface of the clamping plate with the apparatuses provided for machining the workpiece. For this purpose, it is only necessary to machine the clamping plate sucked against the table as required according to the workpiece for producing the receiving surface corresponding to the negative form of the profiled surface of the workpiece by means of the apparatus provided for profiling the surface of the workpiece, which may optionally occur with separate tools if the tools used for machining the positive shape are unsuitable as a result of the negative shape. This applies especially to clamping plates with a honeycomb structure due to the structure-dependent machining conditions. Since the receiving surface of the clamping plate corresponds to the negative shape of the workpiece to be received, there are only minor changes with respect to the programming of the control of the machine tools programmed for the production of the profiled workpiece surface in order to machine the receiving surface for the clamping plate.

BRIEF DESCRIPTION OF THE DRAWINGS

The subject matter of the invention is shown in the drawing by way of example, wherein:

FIG. 1 shows a chucking apparatus for a workpiece with honeycomb structure in a schematic cross-sectional view through the workpiece sucked against the table;

FIG. 2 shows a schematic cross-sectional view of the clamping plate chucked on the table for the machining of the receiving surface;

FIG. 3 shows the workpiece properly chucked via the clamping plate in relation to the table in a view according to FIGS. 1 and 2, and FIG. 4 shows a sectional view through the completed workpiece.

DETAILED DESCRIPTION OF PREFERRED EMBODIMENTS

The machined workpiece 1 with a honeycomb structure, e.g. the core of a wing profile, comprises two mutually opposite profiled surfaces 3 and 4 according to FIG. 4, which are respectively determined by the face ends of the honeycombs 2 and which taper off on a longitudinal side of the workpiece 1 into a thin edge 5.

A honeycomb plate with parallel surfaces is assumed for the production of such a workpiece 1 according to FIG. 1, which surfaces are masked on one side by an air-tight film 6 in order to be placed in an aligned manner with said masked side on an air-permeable table 8 which is connected to a suction box 7. As a result of the application of a vacuum to the table 8 via the suction box 7, the workpiece 1 is clamped down on the table 8 ready for machining. The one of the two surfaces 3, 4 can thus be machined with a multi-axis machining apparatus which is fitted with cutter or milling tools. The surface 3 to be machined is shown in a dot-dash line in FIG. 1. The boundary regions of the workpiece 1 which protrude beyond the surface 3 to be machined are used as counter stops 9 for centering the workpiece 1 in relation to a clamping plate 10 on which the workpiece 1 is tightly held for the machining of the second surface 4.

Said clamping plate 10, which needs to be arranged in an open-cell manner and is preferably also made of a honeycomb plate, must be provided with a receiving surface 11 which corresponds to the negative shape of the already profiled surface 3 of the workpiece 1. The production of said receiving surface 11 preferably occurs by the machining apparatus with which the profiled surface 3 of the workpiece 1 was machined. It may be necessary to use separate cutter and milling tools due to the shape of the receiving surface 11 which is complementary to the profiled surface 3. The clamping plate 10 is accordingly sucked in an aligned manner against the table 8 for machining by masking one side of plate with an air-impermeable film 6. The receiving surface 11, which corresponds to the negative shape of the surface 3, can thus be produced in a simple manner, wherein the clamping plate 10 is provided with re-entrant centering stops 12 which cooperate with the counter stops 9 of the workpiece 1 that is machined on one side.

FIG. 3 shows the chucking of the workpiece 1 for machining the second surface 4. The workpiece 1 is placed with the already profiled surface 3 covered by an air-impermeable film 6 on the receiving surface 11 of the clamping plate 10 which is placed in an aligned manner on the table 8, wherein the centering stops 12 align the workpiece 1 via its counter stops 9 precisely in relation to the clamping plate 10. Since there is substantial engagement of the vacuum from the suction box 7 on the workpiece 1 via the honeycomb structure of the clamping plate 10, the workpiece 1 is held in an analogous manner ready for machining for direct chucking in accordance with FIG. 1 on the clamping plate 10, so that the surface 4 can be machined.

As is shown in FIG. 3, the machining occurs in such a way that the protruding counter stops 9 are only severed after the complete machining of the service 4, so that the protruding counter stops 9 ensure secure retaining of the workpiece 1 in said boundary region for the machining of the workpiece 1 in the trailing region of the edge 5.

What is claimed is:

1. A chucking apparatus for a workpiece with honeycomb structure, comprising a table that can be supplied with vacuum and a clamping plate which can be placed on the table and which accommodates the workpiece in the region of an already profiled surface which is determined by the face ends of the honeycombs, whose receiving surface is pre-finished and corresponds to the negative form of the profiled surface of the workpiece and is provided with suction openings to the table, wherein the clamping plate is formed as a honeycomb plate with an open-cell honeycomb structure, and wherein face sides of the honeycombs of the honeycomb structure determine the receiving surface and the honeycombs form flow channels aligned in parallel to the suction direction and separated from each other by honeycomb walls of the honeycombs.

2. A chucking apparatus according to claim 1, wherein the clamping plate, adjacent to the receiving surface for the workpiece, forms a re-entrant centering stop which cooperates with a counter stop of the workpiece.

3. A method for producing a clamping plate according to claim 1, wherein the clamping plate, which is sucked against the table ready for machining according to the workpiece, is machined by an apparatus provided for profiling the surface of the workpiece for producing the receiving surface corresponding to the negative shape of the profiled surface of the workpiece, optionally by using separate tools.

* * * * *